United States Patent
Li

(10) Patent No.: US 8,964,954 B2
(45) Date of Patent: Feb. 24, 2015

(54) METHOD AND APPARATUS OF RE-RATING FOR PREPAID USERS

(75) Inventor: Xiangyang Li, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/007,158

(22) PCT Filed: Mar. 13, 2012

(86) PCT No.: PCT/IB2012/000733
§ 371 (c)(1),
(2), (4) Date: Sep. 24, 2013

(87) PCT Pub. No.: WO2012/127324
PCT Pub. Date: Sep. 27, 2012

(65) Prior Publication Data
US 2014/0016763 A1 Jan. 16, 2014

(30) Foreign Application Priority Data

Mar. 24, 2011 (CN) .......................... 2011 1 0085155

(51) Int. Cl.
*H04M 15/00* (2006.01)
*H04M 17/00* (2006.01)
(Continued)

(52) U.S. Cl.
CPC ........... *H04M 17/10* (2013.01); *H04L 12/1428* (2013.01); *H04L 12/1467* (2013.01);
(Continued)

(58) Field of Classification Search
CPC ...... H04Q 30/04; H04M 15/41; H04M 15/42; H04M 15/44; H04M 15/59; H04M 15/64; H04M 15/66; H04M 15/81; H04M 2215/0112; H04M 2215/0164; H04M 2215/14; H04M 2215/70; H04M 2215/012; H04W 4/24
USPC .................... 379/111, 114.01, 114.12, 114.2, 379/121.01, 121.02, 121.05, 126, 127.04, 379/128, 114.05, 114.1
See application file for complete search history.

(56) References Cited

U.S. PATENT DOCUMENTS

| 7,797,206 | B1 * | 9/2010 | Marchbanks et al. .......... 705/34 |
| 7,930,225 | B2 * | 4/2011 | Wahlberg et al. ............... 705/30 |
| 7,940,904 | B2 * | 5/2011 | Cai et al. .................. 379/114.28 |
| 8,341,044 | B1 * | 12/2012 | Patro et al. ...................... 705/34 |

(Continued)

OTHER PUBLICATIONS

International Search Report for PCT/IB2012/000733 dated Aug. 30, 2012.
EP Search Report dated Jul. 22, 2014.

*Primary Examiner* — Binh Tieu
(74) *Attorney, Agent, or Firm* — Fay Sharpe LLP

(57) ABSTRACT

A method for re-rating a prepaid user is proposed in the present invention. Compared with prior prepaid systems, the present invention introduces new functional entities, i.e. a re-rating management apparatus and an offline charging apparatus, and enhances the existing functional-entity, i.e. the online charging apparatus. The online charging apparatus rates call detail records comprised in an received online charging request to generate rated call detail records, and sends—the rated call detail records to the re-rating management apparatus; periodically backs up account profile, and sends the backed up account profile to the re-rating management apparatus; the re-rating management apparatus triggers re-rating, sends a re-rating request to the offline charging apparatus; the offline charging apparatus generates re-rated call detail records after re-calculating, the call detail records, and sends the re-rated call detail records to the re-rating management apparatus; and the re-rating management apparatus updates account profile in accordance with the re-rated call detail records, and sends the updated account profile to the online charging apparatus. By using the method of the present invention, the re-rating function can be implemented for the prepaid user without affecting the real-time use by the prepaid user, and the problems occurring in the convergence of a prepaid charging system and a postpaid charging system can be solved.

9 Claims, 5 Drawing Sheets

(51) Int. Cl.
*H04L 12/14* (2006.01)
*H04M 17/02* (2006.01)

(52) U.S. Cl.
CPC .............. *H04M15/43* (2013.01); *H04M 15/64* (2013.01); *H04M 15/65* (2013.01); *H04M 15/70* (2013.01); *H04M 15/73* (2013.01); *H04M 15/80* (2013.01); *H04M 15/8011* (2013.01); *H04M 15/81* (2013.01); *H04M 15/851* (2013.01); *H04M 15/854* (2013.01); *H04M 17/02* (2013.01)
USPC .............. 379/114.2; 379/114.05; 379/114.12; 379/121.02; 379/121.05

(56) References Cited

U.S. PATENT DOCUMENTS

| | | | |
|---|---|---|---|
| 2002/0147001 | A1* | 10/2002 | Newdelman et al. ......... 455/405 |
| 2003/0130914 | A1 | 7/2003 | Cinotti et al. |
| 2006/0248010 | A1 | 11/2006 | Krishnamoorthy et al. |
| 2007/0036312 | A1 | 2/2007 | Cai et al. |
| 2007/0242816 | A1 | 10/2007 | Cai et al. |
| 2008/0040267 | A1 | 2/2008 | Krishnamoorthy et al. |
| 2008/0130850 | A1* | 6/2008 | Bencheqroun et al. .. 379/114.04 |
| 2010/0005012 | A1* | 1/2010 | Wahlberg et al. ............... 705/30 |
| 2010/0041365 | A1* | 2/2010 | Lott et al. ...................... 455/406 |
| 2011/0086610 | A1* | 4/2011 | Baldwin et al. ............... 455/405 |

* cited by examiner

METHOD AND APPARATUS OF RE-RATING FOR PREPAID USERS

FIELD OF THE INVENTION

The present invention relates to a communication network, and more particularly to a processing method and apparatus for re-rating in the communication network.

BACKGROUND OF THE INVENTION

Currently, most operators need to maintain two separated charging systems, i.e. an IT based postpaid charging system and an intelligent-networks based prepaid charging system. The postpaid charging system employs an offline charging manner, and it periodically collects Call Detail Records (CDRs) over network, determines the expense for a call according to the information (e.g. the call duration for a user, caller information, callee information, position information, etc.) included in the call detail record, and determines the tariff based on the call detail record after the call. Therefore it is impossible to achieve a real-time control for a user's call. The prepaid charging system employs an online charging manner, and it determines in real time a duration for a user to make a call in accordance with the balance of the user's account. When the user runs out of the balance of his account, the call will be cut off immediately. The prepaid charging system needs to monitor and control the call of the user in real time.

For an operator, maintaining two charging systems means a high cost and furthermore some functionalities of one system cannot be implemented or cannot be implemented well in the other system. For example, re-rating is a functionality of the postpaid charging system, which can re-rate the expense for the call detail record in accordance with changes of the service price. However, it is difficult for the real-time prepaid charging system to realize re-rating because the prepaid charging system needs to monitor a user's call request in real time and to update the user's account profile in real time and cannot make recalculation on the user's account profile as if it was rolled back to a previous stage. Specifically, for the prepaid charging system, before each call is established, the system will read the user's account profile, and if the account profile is updated at this time, it is impossible for the system to read the current account profile for the current call request or read a wrong account profile.

More and more operators and market analyzers recognize that a charging system converging both the postpaid charging system and the prepaid charging system will be the future developing trend, and such a converged charging system not only can reduce the cost but also can provide users with blended services. Most operators urgently demand such converged charging system provided by the vendors.

However, as stated above, re-rating is a functionality of the postpaid charging system and it is difficult to be implemented in the prepaid charging system. How to implement the re-rating function for the converged charging system will be a challenge. Thus, an approach to implement the re-rating function for the prepaid charging system is needed.

SUMMARY OF THE INVENTION

In order to solve the above problems in the prior art, a method and an apparatus for re-rating prepaid users is proposed in the present invention.

According to a first aspect of the present invention, a method for re-rating a prepaid user implemented in a first apparatus ($2a$) is provided, the method including: rating a call detail record included in a received online charging request to generate a rated call detail record, and updating account profile of the user at the same time; and sending to a second apparatus ($2b$) a rating information transmission request message including the rated call detail record;

the method further including: periodically storing the account profile, and sending to the second apparatus ($2b$) an account profile transmission request message including the stored account profile;

the method further including: updating the locally stored account profile in accordance with the updated account profile included in an account profile update request received from the second apparatus ($2b$).

According to a second aspect of the present invention, a method for re-rating a prepaid user implemented in a second apparatus ($2b$) is provided, the method including: receiving from a first apparatus ($2a$) a rating information transmission request message including a rated call detail record, and extracting the rated call detail record; receiving from the first apparatus ($2a$) an account profile transmission request message including an account profile, and extracting the account profile;

the method further including: triggering re-rating and determining a re-rating rule; a re-calculating step for generating a re-rated call detail record in accordance with the re-rating rule; and updating a corresponding account profile in accordance with the re-rated call detail record, and sending to the first apparatus ($2a$) an account profile update request including the updated account profile.

Preferably, the re-calculating step further includes: determining a start point of re-rating, updating the account profile for the start point of re-rating in accordance with the re-rating rule, and sending to a third apparatus ($2c$) a start point account profile transmission request including the updated account profile for the start point of re-rating; determining call detail records to be re-rated; sending to the third apparatus ($2c$) a re-rating request message including one or more call detail records to be re-rated; and receiving from the third apparatus ($2c$) a re-rating reply message including one or more re-rated call detail records.

According to a third aspect of the present invention, a method for re-rating a prepaid user implemented in a third apparatus ($2c$) is provided, the method including: receiving from a second apparatus ($2b$) a start point account profile transmission request including the updated account profile for a start point of re-rating, and extracting a rating rule for re-rating therefrom; receiving from the second apparatus ($2b$) a re-rating request including one or more call detail records to be re-rated, and extracting the call detail records to be re-rated; re-rating the call detail records to be re-calculated in accordance with the rating rule for the re-rating to generate re-rated call detail records; and sending to the second apparatus ($2b$) a re-rating reply message including one or more re-rated call detail records.

According to a fourth aspect of the present invention, a first apparatus ($2a$) for re-rating a prepaid user is provided, the apparatus including: a rating means configured to rate call detail records included in a received online charging request to generate rated call detail records and to update account profile of the user at the same time; and a rating information transmitting means configured to send to a second apparatus ($2b$) a rating information transmission request message including the rated call detail records;

the apparatus further including: an account backing up means configured to periodically store the account profile, and to send to the second apparatus (2b) an account profile transmission request message including the stored account profile;

the apparatus further including: a first account updating means configured to update the locally stored account profile in accordance with the updated account profile included in an account profile update request received from the second apparatus (2b).

According to a fifth aspect of the present invention, a second apparatus (2b) for re-rating a prepaid user is provided, the apparatus including: a rating information receiving means configured to receive from a first apparatus (2a) a rating information transmission request message including rated call detail records, and to extract the rated call detail records; and an account profile receiving means configured to receive from the first apparatus (2a) an account profile transmission request message including account profile, and to extract the account profile;

the apparatus further including: a triggering means configured to trigger re-rating and to determine a re-rating rule; a re-calculating means configured to generate re-rated call detail records in accordance with the re-rating rule; and a second account updating means configured to update a corresponding account profile in accordance with the re-rated call detail records, and to send to the first apparatus (2a) an account profile update request including the updated account profile.

Preferably, the re-calculating means further includes: a start point account updating means configure to determine the start point of re-rating and to update the account profile for the start point of re-rating in accordance with the re-rating rule, and to send to a third apparatus (2c) a start point account profile transmission request including the updated account profile for the start point of re-rating; a determining means configured to determine call detail records to be re-rated; a re-rating request sending means configured to send to the third apparatus (2c) a re-rating request message including one or more call detail records to be re-rated; and a re-rating reply receiving means configured to receive from the third apparatus (2c) a re-rating reply message including one or more re-rated call detail records.

According to a sixth aspect of the present invention, a third apparatus (2c) for re-rating a prepaid user is provided, the apparatus including: a start point account profile receiving means configured to receive from a second apparatus (2b) a start point account profile transmission request including the updated account profile for a start point of re-rating, and to extract a rating rule for re-rating therefrom; a re-rating request receiving means configured to receive from the second apparatus (2b) a re-rating request including one or more call detail records to be re-rated, and to extract the call detail records to be re-rated; a re-rated record generating means configured to re-rate the call detail records to be re-rated in accordance with a rating rule for re-rating to generate re-rated call detail records; and a re-rating reply sending means configured to send to the second apparatus (2b) a re-rating reply message including one or more re-rated call detail records.

According to a seventh aspect of the present invention, a system for re-rating a prepaid user is provided, including: the aforesaid first apparatus (2a), the aforesaid second apparatus (2b) and the aforesaid third apparatus (2c).

By using the method and apparatus of the present invention, the re-rating function can be implemented for prepaid users without affecting the real-time use by the prepaid users. Thus, operators may converge the prepaid charging system and the postpaid charging system into one charging system, which not only can efficiently reduce operators' operation and maintenance cost but also can provide users with unified blended services, wherein the same charging function can be applicable to both prepaid users and postpaid users at the same time.

BRIEF DESCRIPTION OF THE DRAWINGS

Other features, objects and advantages of the present invention will become more apparent with reference to the following detailed description to the nonrestrictive embodiments in conjunction with the accompanying drawings.

DETAILED DESCRIPTION OF EMBODIMENTS

Firstly, explanations are made to the following concepts used in this text:

Call Detail Record (CDR) refers to information related to a certain call, at least including information such as calling and called numbers, call date, call time and call duration.

Rated call detail record refers to the expense information of a certain call calculated in accordance with the call detail record of the call and the current rating rule, at least including information such as calling and called numbers, call date, call time, call duration and call expense of the call.

Re-rated call detail record refers to the expense information of a certain call recalculated in accordance with the call detail record of the call and the rating rule for re-rating, at least including information such as calling and called numbers, call date, call time, call duration and recalculated call expense of the call.

Account profile refers to information related to an account of a prepaid user, at least including the current balance of the account and the rating rule for the subscribed telecommunication service.

Figure 1:
FIG. 1 is a schematic diagram of a prepaid charging system in the prior art.

FIG. 1 illustrates a schematic diagram of a charging system for charging a prepaid user in the prior art. Network 101 sends an online charging request to an online charging apparatus 1a. The online charging apparatus 1a extracts the information related to the caller and callee in the call detail record included in the online charging request to determine the corresponding account, and obtains corresponding account profile by searching the locally stored database to further obtain the current balance of the account. The online charging apparatus 1a will further extract the information related to the call in the call detail record included in the online charging request, and then rate the call in accordance with the current rating rule to generate a rated call detail record, and update the locally stored account profile in accordance with the information related to the call expense in the rated call detail record at the same time.

It can be seen that, since the prepaid charging system needs to update account profile in real time, the re-rating function cannot be implemented. For example, if the current date is February 15, then the balance in the current account profile is the balance at the current time on February 15. When it is necessary to re-rate the calls from 0 am on February 2 to the current time on February 15 in accordance with a new rating rule, the system needs the balance of the account of 0 am on February 2, but this information cannot be obtained from the current system.

Thus, to solve the above problem, an approach for re-rating for prepaid users is proposed in the present invention. In the following, the method will be described in more detail with reference to FIG. 2.

Figure 2:
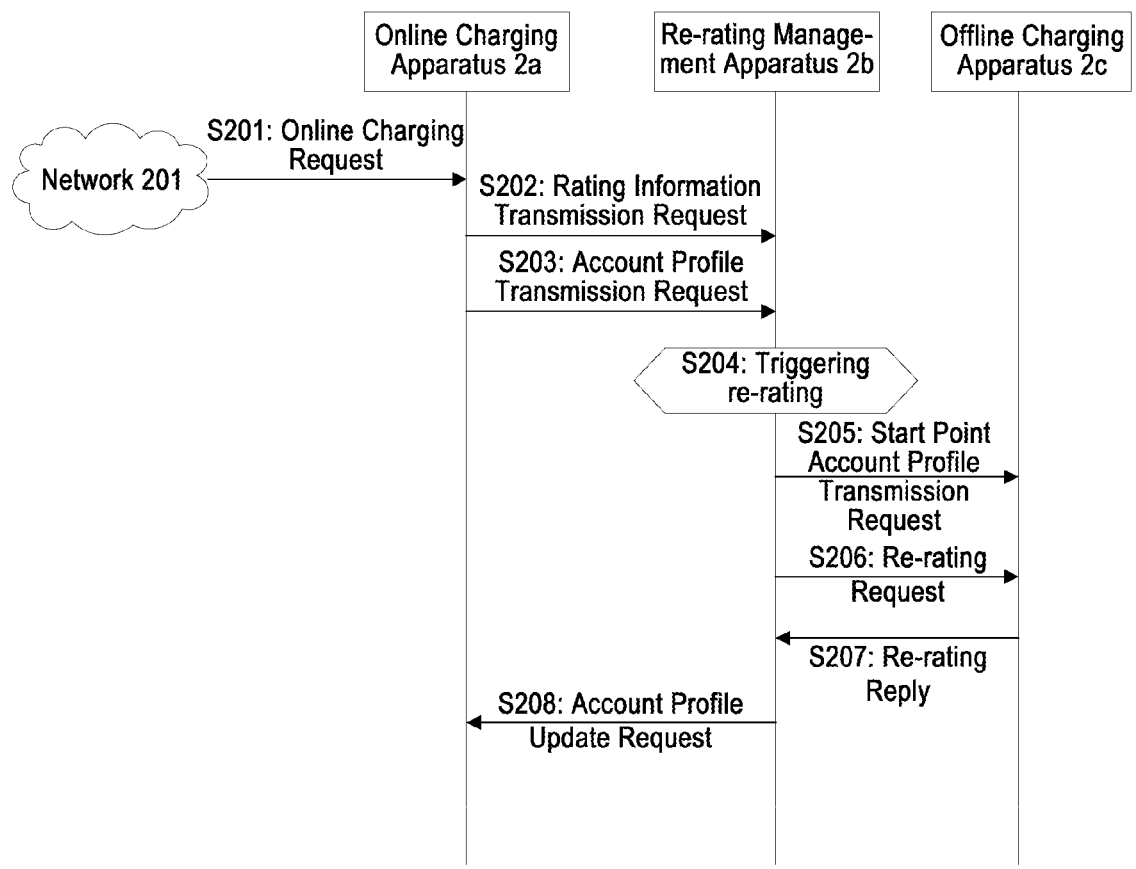
FIG. 2 is a flowchart illustrating the re-rating for prepaid users according to a specific embodiment of the present invention.

FIG. 2 illustrates a flowchart of the re-rating for prepaid users according to a specific embodiment of the present invention. Seen from FIG. 2, the prepaid charging system of the present invention at least includes an online charging apparatus $2a$, a re-rating management apparatus $2b$ and an offline charging apparatus $2c$.

Here, the online charging apparatus $2a$, the re-rating management apparatus $2b$ and the offline charging apparatus $2c$ are all functional entities, and they may exist in a same network server or in different network servers. For example, the online charging apparatus $2a$, the re-rating management apparatus $2b$ and the offline charging apparatus $2c$ may respectively exist in three different network servers; or the online charging apparatus $2a$ exists in one network server while the re-rating management apparatus $2b$ and the offline charging apparatus $2c$ exist in another network server; or the online charging apparatus $2a$, the re-rating management apparatus $2b$ and the offline charging apparatus $2c$ exist in a same network server.

Compared with FIG. 1, the re-rating management apparatus $2b$ and the offline charging apparatus $2c$ are both newly added functional entities while the online charging apparatus $2a$ has additional functions with respect to the existing online charging apparatus $1a$.

The method starts at Step S201 where the online charging apparatus $2a$ receives an online charging request from Network 201, and the online charging request includes detailed information of a call to be rated. For this request, the online charging apparatus $2a$ will execute the following actions:

the online charging apparatus $2a$ rates the call detail record included in the online charging request to generate a rated call detail record, e.g. obtaining the call expense in accordance with the current rating rule and the call duration included in the call detail record, and then updating the user's account profile in accordance with the expense caused by the call and the current balance of the account corresponding to the call;

the online charging apparatus $2a$ sends a rating information transmission request to the re-rating management apparatus $2b$, as shown in Step S202 of FIG. 2, wherein the rating information transmission request includes the generated rated call detail record.

In addition, the online charging apparatus $2a$ will periodically back up the current account profile, e.g. storing the current account profile at 0 am every day. Then Step S203 shown in FIG. 2 is executed. That is, an account profile transmission request to the re-rating management apparatus $2b$ is sent, the request including the stored account profile.

It needs to be pointed out that there is no necessary sequence between Step S202 and Step S203. Step S202 is triggered by the online charging apparatus $2a$ upon receiving an online charging request while Step S203 is triggered periodically.

The re-rating management apparatus $2b$, after receiving the rating information transmission request from the online charging apparatus $2a$, will extract the rated call detail record therefrom and store it locally.

The re-rating management apparatus $2b$, after receiving the account profile transmission request from the online charging apparatus $2a$, will extract the backed up account profile and store it locally.

The re-rating management apparatus $2b$ triggers the re-rating and determines the re-rating rule in accordance with external or internal conditions, i.e. executing Step S204 shown in FIG. 2. The re-rating may be triggered externally, e.g. if the operator wants to charge the calls within a certain period of time in a new tariff, and alternatively it may be triggered internally, e.g. if the system finds that the charging within certain period of time has errors to be corrected and needs to be re-rated. Meanwhile, at Step S204, the re-rating management apparatus $2b$ will further determine a re-rating rule. For example, the current rating standard is 1 yuan/per minute and the new rating standard is 0.6 yuan/per minute.

Then, the re-rating management apparatus $2b$ will execute a re-calculating step, i.e. generating a rated call detail record in accordance with the re-rating rule, wherein the re-rated call detail record includes the call expense re-calculated for the call.

Specifically, one embodiment of the re-calculating step is as follows:

a start point of re-rating is determined. For example, if the current date is February 15, and the operator wants to re-rate the calls from 0 am on February 2 to the current time in a new tariff, the re-rating management apparatus $2b$ will determine the start point of re-rating as 0 am on February 2, and then update the account profile at the start point of re-rating in accordance with the re-rating rule. For example, the rating rule for locally stored account profile at 0 am on February 2 is updated from 1 yuan/per minute to 0.6 yuan/per minute. Then a start point account profile transmission request is sent to the offline charging apparatus $2c$ including the updated account profile at the start point of re-rating.

the call detail record to be re-rated is determined in accordance with the re-rating rule. For example, if the current date is February 15, and the operator wants to re-rate all of the calls from February 2 to the current date in a new tariff, the re-rating management apparatus $2b$ will determine that the call detail records to be re-rated are all calls from February 2 to the current date. If the operator wants to re-rate the calls for a user A from February 2 to the current date in a new tariff, the re-rating management apparatus $2b$ will determine that the call detail records to be re-rated are the calls for the user A from February 2 to the current date.

as shown in Step S206 of FIG. 2, a re-rating request message is sent to the offline charging apparatus $2c$, the message including one or more call detail records to be re-calculated. The re-rating management apparatus $2b$ may send to the offline charging apparatus $2c$ a re-rating request message including all call detail records to be re-rated. Alternatively, a re-rating request message for each call detail record to be re-rated may be sent respectively.

After receiving the start point account profile transmission request (as shown in Step S205 of FIG. 2), the offline charging apparatus $2c$ will extract the rating rule for re-rating therefrom.

After receiving the re-rating request message (as shown in Step S206 of FIG. 2), the offline charging apparatus 2c will extract one or more call detail records to be re-rated therefrom.

Then, the offline charging apparatus 2c re-rates the call detail records to be re-calculated in accordance with the rating rule for re-rating to generate re-rated call detail records. For example, the call detail records to be re-rated are shown in the following Table 1:

TABLE 1

| ... | Caller | Call Date | Call Time | Call Duration (minute) | ... |
|---|---|---|---|---|---|
| ... | 1381000000 | 2011-2-3 | 09:54 | 9 | ... |
| ... | 1381000009 | 2011-2-2 | 13:12 | 12 | ... |

Assuming that the current tariff for the system is 1 yuan/per minute and the tariff for re-rating is 0.6 yuan/per minute, the re-rated call detail records obtained by the offline charging apparatus 2c are shown in the following Table 2:

TABLE 2

| ... | Caller | Call Date | Call Time | Call Duration (minute) | Recalculated Call Expense (yuan) | ... |
|---|---|---|---|---|---|---|
| ... | 1381000000 | 2011-2-3 | 09:54 | 9 | 5.4 | ... |
| ... | 1381000009 | 2011-2-2 | 13:12 | 12 | 7.2 | ... |

After obtaining the re-rated call detail records, the offline charging apparatus 2c will execute Step S207 shown in FIG. 2, i.e. sending a re-rating reply message to the re-rating management apparatus 2b, the message including the one or more re-rated call detail records. Corresponding to the Step S206, the offline charging apparatus 2c may send a re-rating reply message including all re-rated call detail records or may alternatively send a re-rating reply message for each re-rated call detail record respectively.

After receiving the re-rating reply message, the re-rating management apparatus 2b updates a corresponding account profile in accordance with the re-rated call detail record included therein. In case of multiple re-rating reply messages, the re-rating management apparatus 2b will update corresponding account profile after receiving all re-rated call detail records. For example, if the system needs to re-rate the calls from 0 am on February 2 to the current time on February 15, the re-rating management apparatus 2b reads the account balance in the account profile at 0 am on February 2 and then reads the records of February 2 in the re-rated call detail records, calculates the account balance at 0 am on February 3, and updates the account profile at 0 am on February 3. It will be understood that the rating rule for the account profile on February 3 will also be updated. On the analogy of this, the re-rating management apparatus 2b calculates respective account balances from February 3 to the current date and updates corresponding account profile.

Then, the re-rating management apparatus 2b will send to the online charging apparatus 2a an account profile update request, as shown in Step S208 of FIG. 2, the account profile update request including the updated account profile such as the updated account profile from February 2 to the current date.

After receiving the account profile update request, the online charging apparatus 2a updates the locally stored account profile in accordance with the account profile included therein, e.g. updating the locally stored account profiles from February 2 to the current date to the corresponding account profiles in the account profile update request.

Now, the charging system of the present invention finishes the re-rating process for prepaid users, achieves re-rating of the call detail records, and timely updates the corresponding account profile without affecting the real-time use by users.

Figure 3:
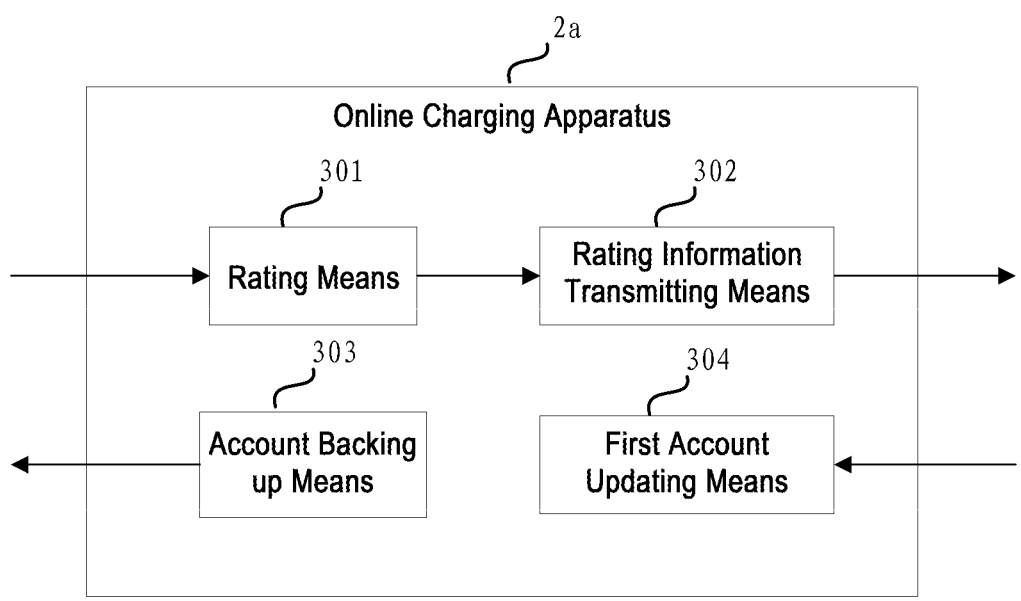
FIG. 3 is a block diagram illustrating the structure of an online charging apparatus according to a specific embodiment of the present invention.

FIG. 3 illustrates a structural block diagram of the online charging apparatus 2a according to a specific embodiment of the present invention. In FIG. 3, the online charging apparatus 2a includes a rating means 301, a rating information transmitting means 302, an account backing up means 303 and a first account updating means 304.

In the following, the operating process of the online charging apparatus 2a will be described in more detail with reference to FIG. 2.

Firstly, the rating means 301 receives the online charging request from Network 201, as shown in Step S201 of FIG. 2, and the online charging request includes detailed information of the call to be rated. For this request, the rating means 301 will execute the following actions: rating the call detail records included in the online charging request to generate rated call detail records. For example, the expense for a call may be obtained in accordance with the current rating rule and the call duration included in the call detail record, and then the account profile of a user is updated in accordance with the expense caused by the call and the current balance of the call expense for the account corresponding to the call.

Thereafter, the rating information transmitting means 302 sends the rating information transmission request to the re-rating management means 2b, as shown in Step S202 of FIG. 2, wherein the rating information transmission request includes the generated rated call detail record.

In addition, the account backing up means 303 will periodically back up the current account profile, e.g. storing the current account profile at 0 am every day, and then executes Step S203 shown in FIG. 2, i.e. sending an account information transmission request to the re-rating management means 2b, the request including the stored account profile.

It needs to be pointed out that there is no necessary sequence between Step S202 performed by the rating information transmitting means 302 and Step S203 performed by the account backing up means 303. Step S202 is triggered by the rating means 301 upon receiving the online charging request while Step S203 is triggered periodically.

The first account updating means 304 is adapted to receive the account profile update request from the re-rating management apparatus 2b, as shown in Step S208 of FIG. 2. The account profile update request includes the re-calculated account profile, and the first account updating means 304 updates the locally backed up account profile in accordance with the updated account profile. For example, if the account profile update request includes the updated account profile from February 2 to the current date, the first account updating means 304 will update the locally stored account profile from February 2 to the current date to the account profile in the account profile update request.

Figure 4:
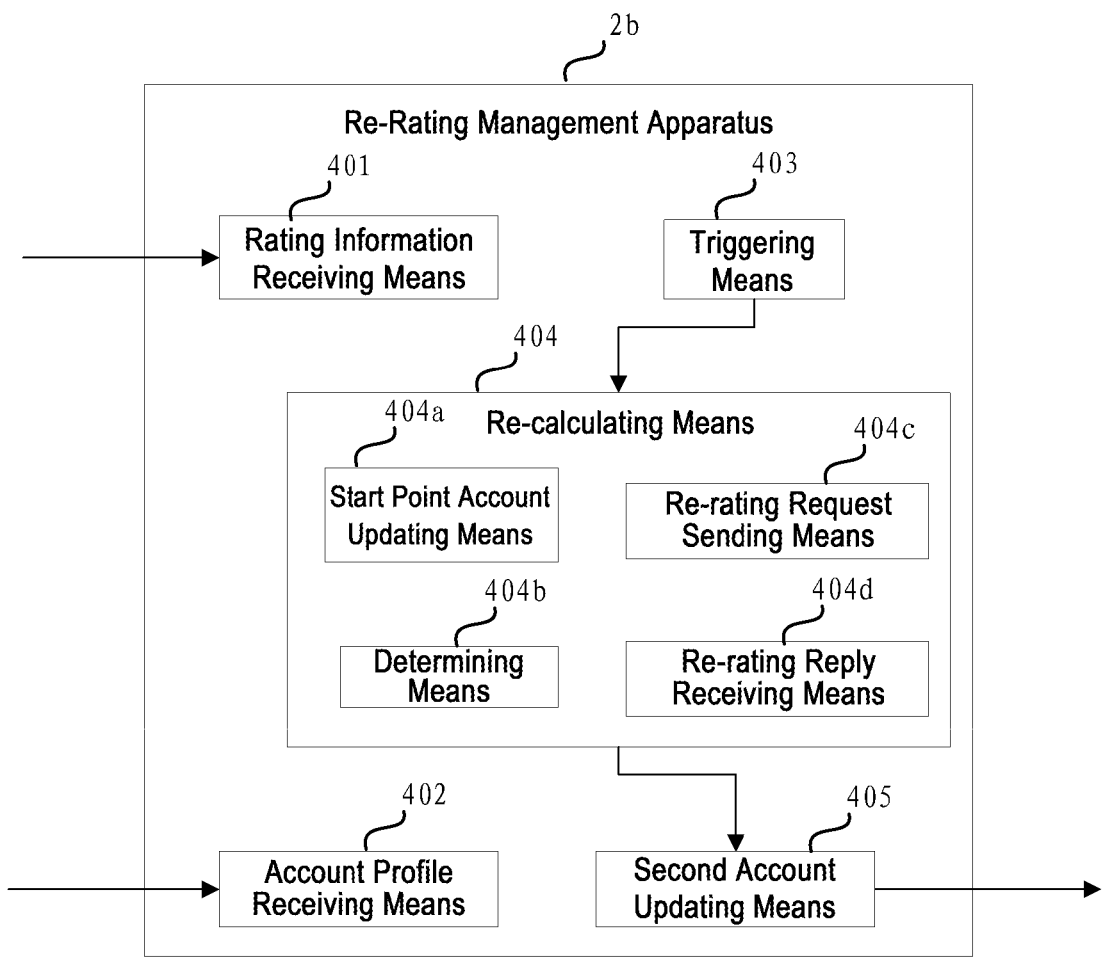
FIG. 4 is a block diagram illustrating the structure of a re-rating management apparatus according to a specific embodiment of the present invention.

FIG. 4 illustrates a structural block diagram of the re-rating management apparatus 2b according to a specific embodiment of the present invention. In FIG. 4, the re-rating management apparatus 2b includes a rating information receiving means 401, an account profile receiving means 402, a triggering means 403, a re-calculating means 404 and a second account updating means 405.

In the following, the operating process of the re-rating management apparatus 2b will be described in more detail with reference to FIG. 2.

The rating information receiving means 401 receives the rating information transmission request from the online charging apparatus 2a, as shown in Step S202 of FIG. 2, and then it will extract and locally store the rated call detail records.

The account profile receiving means 402 receives the account profile transmission request from the online charging apparatus 2a, as shown in Step S203 of FIG. 2, and then it will extract and locally store the backed up account profile.

The triggering means 403 triggers re-rating and determines a re-rating rule in accordance with external or internal conditions, i.e. executing Step S204 shown in FIG. 2. The re-rating may be triggered externally, e.g. if the operator wants to charge the calls within a certain period of time in a new tariff, and it may alternatively be triggered internally, e.g. if the system finds that the charging within certain period of time has errors to be corrected and needs to be re-rated. Meanwhile, at Step S204, the triggering means 403 will further determine the re-rating rule. For example, the current rating standard is 1 yuan/per minute and the new rating standard is 0.6 yuan/per minute.

Then, the re-calculating means 404 will execute the re-calculating step, i.e. generating the re-rated call detail record in accordance with the re-calculating rule, wherein the re-rated call detail record includes the re-calculated call expense for a call.

Preferably, the re-calculating means 404 further includes a start point account updating means 404a, a determining means 404b, a re-rating request sending means 404c and a re-rating reply receiving means 404d.

The start point account updating means 404a is configured to determine a start point of re-rating, e.g. if the current date is February 15, and the operator wants to re-rate the calls from 0 am on February 2 to the current time in a new tariff, the re-rating management apparatus 2b will determine the start point of re-rating as 0 am on February 2. Then the start point account updating means 404a updates the account profile of the start point of re-rating in accordance with the re-rating rule, e.g. updating the rating rule for locally stored account profile at 0 am on February 2 from 1 yuan/per minute to 0.6 yuan/per minute. Then the start point account updating means 404a sends to the offline charging apparatus 2c a start point account profile transmission request including the updated account profile at the start point of re-rating.

The determining means 404b determines the call detail record to be re-rated in accordance with the re-rating rule, e.g. if the current date is February 15, and the operator wants to re-rate all of the calls from February 2 to the current date in a new tariff, the determining means 404b will determine that the call detail records to be re-rated are all calls from February 2 to the current date. If the operator wants to re-rate the calls for a user A from February 2 to the current date in a new tariff, the determining means 404b will determine that the call detail records to be re-rated are the calls for the user A from February 2 to the current date.

The re-rating request sending means 404c sends a re-rating request message to the offline charging apparatus 2c, as shown in Step S206 of FIG. 2, the message including one or more call detail records to be re-calculated. The re-rating request sending means 404c may send to the offline charging apparatus 2c a re-rating request message including all call detail records to be re-rated, and it may alternatively send a re-rating request message for each call detail record to be re-rated respectively.

The re-rating reply receiving means 404d is configured to receive a re-rating reply message from the offline charging apparatus 2c, as shown in Step S207 of FIG. 2, and the re-rating reply message includes one or more re-rated call detail records re-calculated by the offline charging apparatus 2c.

After the re-rating reply receiving means 404d receives the re-rating reply message, the second account updating means 405 updates a corresponding account profile in accordance with the re-rated call detail record included therein. In case of multiple re-rating reply messages, the second account updating means 405 will update corresponding account profile after receiving all re-rated call detail records. For example, if the system needs to re-rate the calls from February 2 to February 15, the second account updating means 405 reads the account balance in the account profile at 0 am on February 2 and then reads the records of February 2 in the re-rated call detail records, calculates the account balance at 0 am on February 3, and updates the account profile at 0 am on February 3. It will be understood that the rating rule for the account profile on February 3 will also be updated. On the analogy of this, the second account updating means 405 calculates respective account balances from February 3 to the current date and updates corresponding account profile.

Then, the second account updating means 405 will send to the online charging apparatus 2a the account profile update request, as shown in Step S208 of FIG. 2, the account profile update request including the updated account profile such as the updated account profile from February 2 to the current date.

Figure 5:
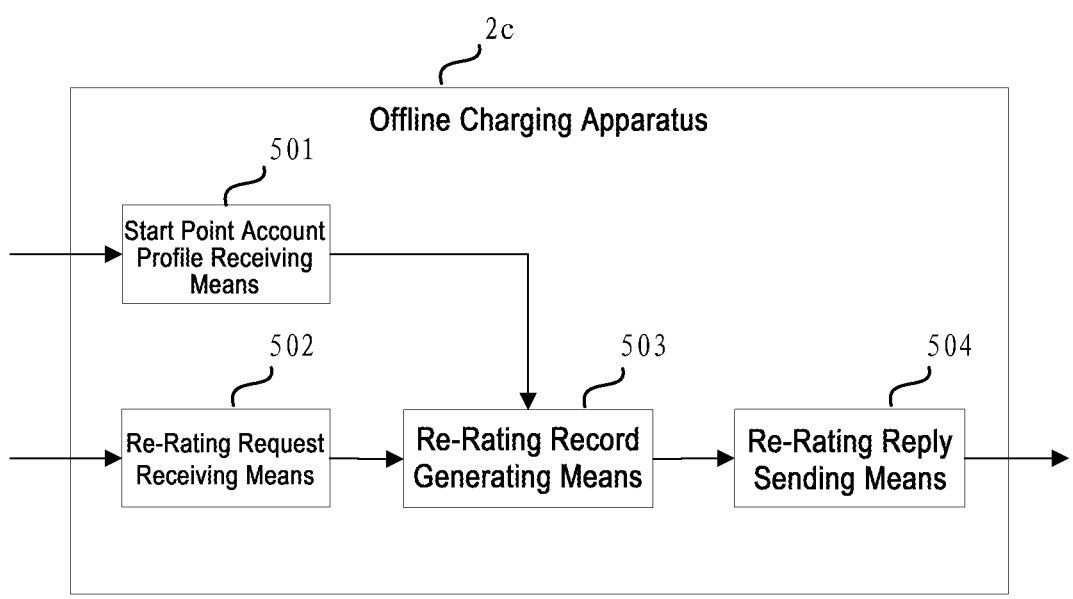
FIG. 5 is a block diagram illustrating the structure of an offline charging apparatus according to a specific embodiment of the present invention.

FIG. 5 illustrates a structural block diagram of the offline charging apparatus 2c according to a specific embodiment of the present invention. In FIG. 5, the offline charging apparatus 2c includes a start point account profile receiving means 501, a re-rating request receiving means 502, a re-rated record generating means 503 and a re-rating reply sending means 504.

In the following, the operating process of the offline charging apparatus 2c will be described in more detail with reference to FIG. 2.

The start point account profile receiving means 501 receives the start point account profile transmission request from the re-rating management apparatus 2b, as shown in Step S205 of FIG. 2, the request including the updated account profile at the start point of re-rating. The start point account profile receiving means 501 will extract the rating rule for the re-rating therefrom.

The re-rating request receiving means 502 receives the re-rating request message from the re-rating management apparatus 2b, as shown in Step S206 of FIG. 2, and then extracts one or more call detail records to be re-rated therefrom.

Then, the re-rated record generating means 503 re-rates the call detail records to be re-calculated in accordance with the rating rule for re-rating to generate re-rated call detail records. For example, the call detail records to be re-rated are as shown in the above Table 1. If the current tariff of the system is 1 yuan/per minute while the tariff of re-rating is 0.6 yuan/per minute, the re-rated call detail records obtained by the offline charging apparatus 2c are as shown in the above Table 2.

After the re-rated record generating means 503 has generated the re-rated call detail record, the re-rating reply sending means 504 will execute Step S207 as shown in FIG. 2, i.e. sending to the re-rating management apparatus 2b a re-rating reply message including one or more re-rated call detail records. The re-rating reply sending means 504 may send a re-rating reply message including all re-rated call detail records and may alternatively send a re-rating reply message for each re-rated call detail record respectively.

As described above, the online charging apparatus 2a, the re-rating management apparatus 2b and the offline charging apparatus 2c are all functional entities, and they should not necessarily be understood by those skilled in the art to be physical network entities.

For those skilled in the art, the present invention is obviously not limited to the details of the illustrative embodiments, and it can be carried out in other specific forms without departure from the spirit or basic features of the present invention. Therefore, no matter from which point of view, the embodiments shall be regarded as illustrative and non-restrictive. The scope of the present invention is defined by the appended claims rather than the above explanations, and thus the present invention intends to include all variants within the meaning and scope of equivalent elements of the claims. In addition, the word "include" obviously does not exclude other units or steps, and the singular form does not exclude the plural form. The wordings of first, second, etc. are used to represent names rather than any specific sequence.

What is claimed is:

1. A method for re-rating a prepaid user implemented in a first apparatus, the method comprising:
    rating a call detail record in a received online charging request to generate a rated call detail record in accordance with a current call rating rule, and updating an account profile of the prepaid user at the same time based on the rated call detail record;
    sending to a second apparatus a rating information transmission request message comprising the rated call detail record;
    periodically storing the account profile, and sending to the second apparatus an account profile transmission request message comprising the stored account profile;
    updating the locally stored account profile in accordance with an updated account profile in an account profile update request received from the second apparatus.

2. A method for re-rating a prepaid user implemented in a second apparatus, the method comprising:
    receiving from a first apparatus a rating information transmission request message comprising a rated call detail record, and extracting the rated call detail record;
    receiving from the first apparatus an account profile transmission request message comprising an account profile, and extracting the account profile;
    triggering re-rating and determining a re-rating rule;
    generating a re-rated call detail record in accordance with the re-rating rule; and
    updating a corresponding account profile in accordance with the re-rated call detail record, and sending to the first apparatus an account profile update request comprising the updated account profile.

3. The method according to claim 2, wherein generating a re-rated call detail record further comprises:
    determining a start point of re-rating, updating account profile for the start point of re-rating in accordance with the re-rating rule, and sending to a third apparatus a start point account profile transmission request comprising the updated account profile for the start point of re-rating;
    determining call detail records to be re-rated;
    sending to the third apparatus a re-rating request message comprising one or more call detail records to be re-rated; and
    receiving from the third apparatus a re-rating reply message comprising one or more re-rated call detail records.

4. A method for re-rating a prepaid user implemented in a third apparatus, the method comprising:
    receiving from a second apparatus a start point account profile transmission request comprising an updated account profile for a start point of re-rating, and extracting a rating rule for re-rating therefrom;
    receiving from the second apparatus a re-rating request comprising one or more call detail records to be re-rated, and extracting the call detail records to be re-rated;
    re-rating the call detail records to be re-calculated in accordance with the rating rule for re-rating to generate re-rated call detail records; and
    sending to the second apparatus a re-rating reply message comprising one or more re-rated call detail records.

5. A first apparatus for re-rating a prepaid user, the apparatus comprising:
    a rater configured to rate call detail records in a received online charging request to generate rated call detail records and to update account profile of the user at the same time;
    a rating information transmitter configured to send to a second apparatus a rating information transmission request message comprising the rated call detail records,
    an account backup configured to periodically store the account profile, and to send to the second apparatus an account profile transmission request message comprising the stored account profile;
    a first account updater configured to update the locally stored account profile in accordance with the update account profile in an account profile update request received from the second apparatus.

6. A second apparatus for re-rating a prepaid user, the apparatus comprising:
    a rating information receiver configured to receive from a first apparatus a rating information transmission request message comprising rated call detail records, and to extract the rated call detail records; and
    an account profile receiver configured to receive from the first apparatus an account profile transmission request message comprising account profile, and to extract the account profile;
    a trigger configured to trigger re-rating and to determine a re-rating rule;
    a re-calculator configured to generate re-rated call detail records in accordance with the re-rating rule; and
    a second account updater configured to update a corresponding account profile in accordance with the re-rated call detail records, and to send to the first apparatus an account profile update request comprising the updated account profile.

7. The apparatus according to claim 6, wherein the re-calculator further comprises:
    a start point account updater configured to determine a start point of re-rating and update account profile for the start point of re-rating in accordance with the re-rating rule, and to send to a third apparatus a start point account profile transmission request comprising the updated account profile for the start point of re-rating;
    a determining processor configured to determine call detail records to be re-rated;
    a re-rating request transmitter configured to send to the third apparatus a re-rating request message comprising one or more call detail records to be re-rated; and
    a re-rating reply receiver configured to receive from the third apparatus a re-rating reply message comprising one or more re-rated call detail records.

8. A third apparatus for re-rating a prepaid user, the apparatus comprising:
- a start point account profile receiver configured to receive from a second apparatus a start point account profile transmission request comprising an updated account profile for a start point of re-rating, and to extract a rating rule for re-rating therefrom;
- a re-rating request receiver configured to receive from the second apparatus a re-rating request comprising one or more call detail records to be re-rated, and to extract the call detail records to be re-rated;
- a re-rating record generator configured to re-rate the call detail records to be re-calculated in accordance with a rating rule for re-rating to generate re-rated call detail records; and
- a re-rating reply transmitter configured to send to the second apparatus a re-rating reply message comprising one or more re-rated call detail records.

9. A system for re-rating a prepaid user, comprising:
- a first apparatus comprising a rater configured to rate call detail records comprised in a received online charging request to generate rated call detail records and to update account profile of the user at the same time; a rating information transmitter configured to send to a second apparatus a rating information transmission request message comprising the rated call detail records; an account backup configured to periodically store the account profile, and to send to the second apparatus an account profile transmission request message comprising the stored account profile; a first account updater configured to update the locally stored account profile in accordance with the update account profile comprised in an account profile update request received from the second apparatus;
- a second apparatus comprising a rating information receiver configured to receive from the first apparatus a rating information transmission request message comprising rated call detail records and to extract the rated call detail records, an account profile receiver configured to receive from the first apparatus an account profile transmission request message comprising account profile and to extract the account profile, a trigger configured to trigger re-rating and to determine a re-rating rule, a re-calculator configured to generate re-rated call detail records in accordance with the re-rating rule and a second account updater configured to update a corresponding account profile in accordance with the re-rated call detail records and to send to the first apparatus an account profile update request comprising the updated account profile, and
- a third apparatus comprising a start point account profile receiver configured to receive from the second apparatus a start point account profile transmission request comprising the updated account profile for a start point of re-rating and to extract a rating rule for re-rating therefrom, a re-rating request receiver configured to receive from the second apparatus a re-rating request comprising one or more call detail records to be re-rated and to extract the call detail records to be re-rated, a re-rating record generator configured to re-rate the call detail records to be re-calculated in accordance with a rating rule for re-rating to generate re-rated call detail records, and a re-rating reply transmitter configured to send to the second apparatus a re-rating reply message comprising one or more re-rated call detail records.

* * * * *